(12) United States Patent
Schwenk

(10) Patent No.: US 11,598,425 B2
(45) Date of Patent: Mar. 7, 2023

(54) MECHANICAL SEAL FOR SEALING A FLUID-CONDUCTING CHANNEL AND/OR SPACE AND METHOD FOR MONITORING THE WEAR OF A MECHANICAL SEAL

(71) Applicant: Christian Maier GmbH & Co. KG, Heidenheim (DE)

(72) Inventor: Gunther Schwenk, Heidenheim (DE)

(73) Assignee: Christian Maier GmbH & Co. KG, Heidenheim (DE)

( * ) Notice: Subject to any disclaimer, the term of this patent is extended or adjusted under 35 U.S.C. 154(b) by 136 days.

(21) Appl. No.: 16/757,379

(22) PCT Filed: Oct. 2, 2018

(86) PCT No.: PCT/EP2018/076757
§ 371 (c)(1),
(2) Date: Apr. 18, 2020

(87) PCT Pub. No.: WO2019/076623
PCT Pub. Date: Apr. 25, 2019

(65) Prior Publication Data
US 2020/0284350 A1   Sep. 10, 2020

(30) Foreign Application Priority Data

Oct. 19, 2017 (DE) .................. 102017218711.5

(51) Int. Cl.
*F16J 15/34* (2006.01)
*F16L 27/08* (2006.01)
(Continued)

(52) U.S. Cl.
CPC ....... *F16J 15/3492* (2013.01); *F16L 27/0816* (2013.01); *G01M 3/183* (2013.01); *G01M 13/005* (2013.01)

(58) Field of Classification Search
CPC ..... F16J 15/34; F16J 15/3492; F16L 27/0816; G01M 3/183; G01M 13/005
See application file for complete search history.

(56) References Cited

U.S. PATENT DOCUMENTS 5,448,924 A   9/1995 Nagai et al.
2014/0355644 A1* 12/2014 Gupta ................... G01K 13/08
374/4
(Continued)

FOREIGN PATENT DOCUMENTS

CN   103791095 B   5/2016
DE   3426539 A1   1/1985
(Continued)

OTHER PUBLICATIONS

International Search Search Report and Written Opinion, ISA/EP, PCT/EP2018/076757, dated Jan. 17, 2019, 13 pages.
IPRP, ISA/EP, PCT/EP2018/076757, dated Jan. 14, 2020, 7 pages.

*Primary Examiner* — Gilbert Y Lee
(74) *Attorney, Agent, or Firm* — Faegre Drinker Biddle & Reath LLP

(57) ABSTRACT

The disclosure relates to a mechanical seal for sealing a fluid-conducting channel and/or space extending in a stationary component and/or a rotating component from the environment, having a slide ring which is supported in the axial direction against a counter ring in a sealing manner and, to compensate for wear on its front-end seal face or on a counter face, is supported against the counter ring elastically and movably in the axial direction with this seal face; having a position sensor to detect the position of the slide ring in the axial direction. The disclosure is characterized in that a temperature sensor is provided on a leakage side of the seal face facing away from the channel and/or space, which sensor at least indirectly detects a temperature which is (Continued)

dependent on the magnitude of a leakage flow passing from the channel and/or space via the seal face.

20 Claims, 2 Drawing Sheets

(51) Int. Cl.
 *G01M 3/18* (2006.01)
 *G01M 13/005* (2019.01)

(56) References Cited

U.S. PATENT DOCUMENTS

| 2017/0108399 A1 | 4/2017 | Rhee |
| 2018/0038488 A1* | 2/2018 | Matheidas ........... F16J 15/3492 |

FOREIGN PATENT DOCUMENTS

| DE | 19724308 A1 | 12/1998 |
| DE | 202007001223 U1 | 6/2007 |
| DE | 102006008463 A1 | 8/2007 |

* cited by examiner

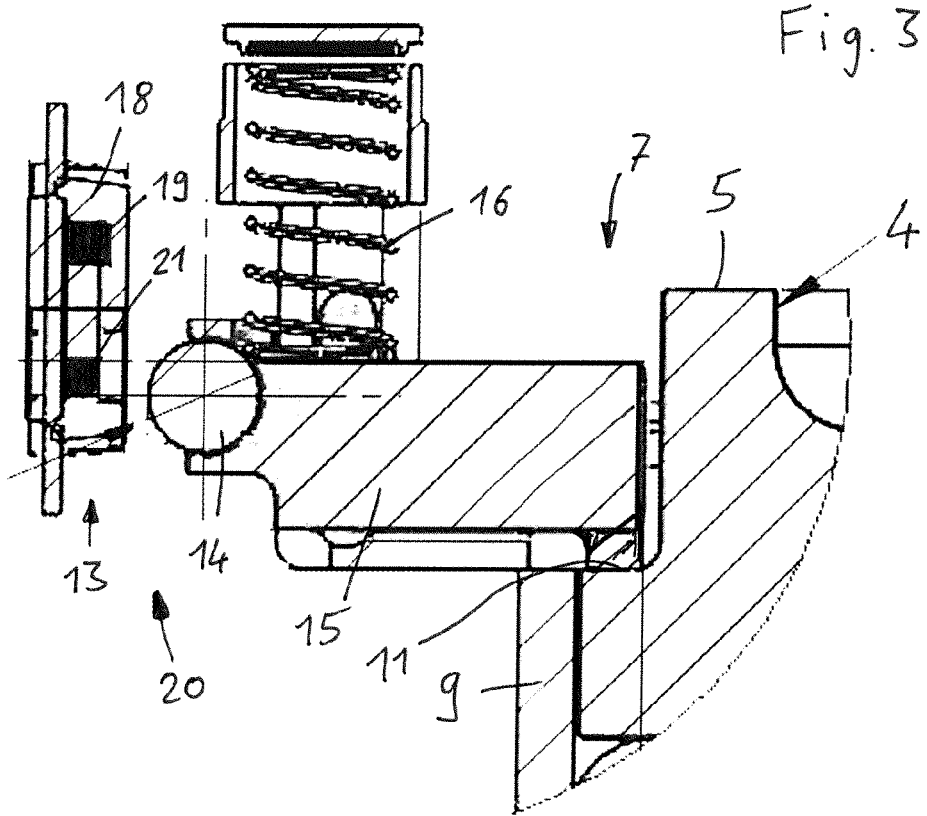
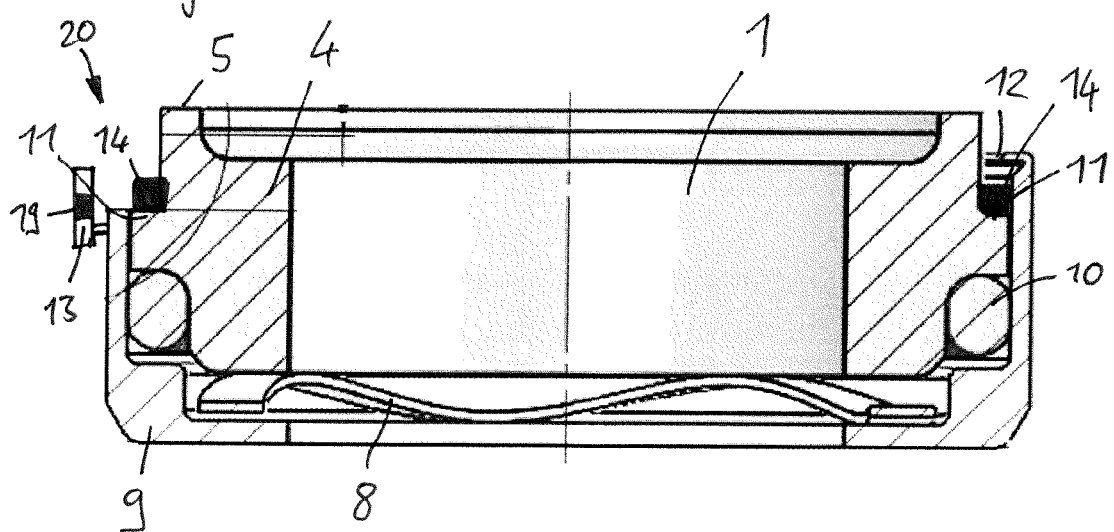

MECHANICAL SEAL FOR SEALING A FLUID-CONDUCTING CHANNEL AND/OR SPACE AND METHOD FOR MONITORING THE WEAR OF A MECHANICAL SEAL

CROSS-REFERENCE TO RELATED APPLICATIONS

The present application is a 371 U.S. National Phase Patent Application based on International Application No. PCT/EP2018/076757, filed Oct. 2, 2018, which claims the benefit of German Patent Application No. DE102017218711.5, filed Oct. 19, 2017, the entire disclosures of which are hereby expressly incorporated herein by reference.

The present disclosure relates to a mechanical seal for sealing at least one fluid-conducting channel and/or space extending in a stationary component and/or a rotating component from the environment, according to the preamble of claim 1, as well as a method for monitoring the wear of such a mechanical seal.

BACKGROUND/SUMMARY

A generic mechanical seal and a method for monitoring the wear of such a mechanical seal is known from DE 34 26 539 A1. The mechanical seal has a slide ring rotating around an axis of rotation, which is supported in the axial direction, i.e. in the direction of the axis of rotation, with its face side against a counter ring. The face side therefore forms the seal face.

The slide ring is subject to wear due to its relative rotation and the elastic support against the counter ring. Due to the wear, the slide ring moves increasingly in the axial direction. In order to ensure that the slide ring can be replaced in good time before the slide ring is excessively worn and thus loses its sealing effect, the wear is detected by providing a probe radially to the axially movable slide ring, which detects how far the slide ring has already moved axially relative to the probe. For this purpose, a magnetic insert can be provided in the slide ring or in a component moving with the slide ring and the probe can be designed as an electromagnetic sensor which detects a signal from the magnetic insert, wherein the signal reaches a maximum when the wear surfaces have reached the maximum wear.

The disadvantage of the known mechanical seal is that although it is possible by detecting the axial position of the mechanical seal, i.e. the position of the mechanical seal in the axial direction, to detect a permanently progressive wear due to abrasion of the slide ring, which signals the need to replace the slide ring, damage in the seal face of the slide ring or also in the facing surface of the counter ring remains undetected if this damage does not affect the axial position of the slide ring. Cracks in the slide ring which lead to leakage without affecting the axial position are also not detected.

Reference is hereby made to DE 197 24 308 A1 and DE 20 2007 001 223 U1 concerning the further prior art. Both documents disclose the detection of a temperature in the area of a slide ring of a mechanical seal on the side of the seal face carrying the fluid. This temperature is essentially determined by the temperature of the supplied fluid and therefore does not allow a reliable conclusion to be drawn about damage as described above.

DE 10 2006 008 463 A1 describes a test device for measuring the vapor emission at a leakage point of mechanical seals. Compressed air is fed into a chamber sealed by the mechanical seal, wherein the compressed air flows over the mechanical seal and entrains the working medium provided there during regular operation of the mechanical seal, in particular water-glycol mixture, over the mechanical seal. From the moisture of the compressed air on the leakage side of the mechanical seal, it is then possible to draw conclusions about the current state of the mechanical seal, for example in the case of a final inspection of the mechanical seal.

The present disclosure is based on the object of specifying a mechanical seal for sealing a channel and/or space extending in a stationary and/or in a rotating component and carrying a fluid, such as liquid or gas, and a method for monitoring the wear of such a mechanical seal, in which not only the continuous wear can be detected, but also defects in the seal face or leaks in the mechanical seal are reliably detected.

The object according to the disclosure is solved by a mechanical seal and a method according to the independent claims. The dependent claims indicate particularly advantageous embodiments of the disclosure.

A mechanical seal according to the disclosure for sealing at least one fluid-conducting channel and/or space extending in a stationary component and/or a rotating component from the environment comprises a slide ring which is supported in a sealing manner in the axial direction against a counter ring. The at least one fluid-conducting channel extends according to an embodiment of the disclosure from a stationary component into a rotating component or from a rotating component into the stationary component, thus through a rotary passage. The rotary passage serves to transfer the fluid from the respective channel section of the stationary component into the respective channel section of the rotating component, i.e. rotating about an axis of rotation, or vice versa. However, the disclosure can also be applied independently of a rotary passage in any component where sealing by a mechanical seal is used. In this respect, the fluid-conducting channel is any space in a stationary component and/or in a rotating component which is sealed against an environment by the mechanical seal. The environment can be any other space in the component and/or in another component, or an environment that is no longer enclosed by housing parts. The environment may be unpressurized or pressurized. The fluid may flow in the channel and/or space or be stationary. The sealing of at least one fluid-conducting channel and/or space in a pump, such as a liquid pump or gas pump, a compressor and other working machines, is only provided as an example.

As the slide ring is supported against the counter ring in the axial direction, i.e. in the direction of the axis of rotation of the rotating component, it is subject to wear. For example, the slide ring is made of or contains carbon. In order to prevent the wear that shortens the slide ring in the axial direction from causing leakage, for example in the rotary passage, the slide ring is movable in the axial direction and, to compensate for the wear, is elastically supported against the counter ring with its seal face on the end face. Progressive wear is thus compensated for by increasing axial displacement of the slide ring in the direction of the counter ring. In addition or alternatively, the counter ring can also be subject to abrasion or wear in the area of a counter face in contact with the seal face of the slide ring, so that to compensate for this, the slide ring is axially displaced by its elastic pretension.

In order to be able to evaluate the extent of wear or the axial movement of the slide ring which has already occurred, a position sensor is provided to detect the position of the slide ring in the axial direction.

According to the disclosure, a temperature sensor is also provided on a leakage side of the seal face facing away from the fluid-conducting channel and/or space. The temperature sensor detects at least indirectly or directly a temperature which is dependent on the size of a leakage flow passing over the seal face from the channel and/or space. The larger the leakage flow, the closer the temperature value detected is to the temperature of the fluid carried in the channel and/or space, due to the heat transfer between the leakage flow and the temperature sensor, at least also by forced convection. The size of the leakage flow is understood to be, for example, the volume flow and/or mass flow of the leakage flow passing over the seal face.

If damage thus occurs in the seal face or the counter ring, which leads to an undesired escape of fluid from the fluid-conducting channel or space across the seal face, this leakage flow, which is increased at least compared with a target state, leads to a temperature change on the side of the seal face, the so-called leakage side, facing away from the fluid-conducting channel/space. This temperature change or a corresponding temperature value is detected by the temperature sensor. The detection can then be used to determine when there is an undesirably large leakage flow.

The leakage side of the seal face facing away from the fluid-conducting channel/space is a position or area downstream of the seal face with respect to a flow direction of the fluid from the fluid-conducting channel/space across the seal face.

The temperature sensor can detect a temperature which depends on the size of a leakage flow emerging from the channel and/or space over the seal face during regular operation of the mechanical seal. Thus, during regular operation of the mechanical seal, the wear of the mechanical seal in particular is continuously monitored. It is not necessary for the mechanical seal to be operated in a test mode in which an additional component or medium is added to the fluid carried in the channel and/or space. Rather, only the fluid already present in the channel and/or space during regular operation is intended to be used, so that the leakage flow, which forms the entire flow over the mechanical seal, is also formed by only a part of this fluid. This fluid can also be called the working medium.

Preferably, the position sensor has at least one magnet fixed to the slide ring, for example inserted into at least one bore, in particular a radial bore, or supported in the axial direction against the slide ring and moving with the slide ring in the axial direction, and a stationary sensor positioned radially outside the slide ring, which detects the position of the magnet in the axial direction. The stationary sensor is designed as a Hall sensor, for example. Such a Hall sensor is in particular traversed by an electric current and generates an output voltage which is proportional to the product of the current and a magnetic flux density generated by the magnet associated with the slide ring.

In particular, the temperature sensor is also integrated in the stationary sensor, for example the Hall sensor.

For example, the stationary sensor has a sensor housing positioned in the leakage flow, within which or at which the temperature sensor is positioned. According to an advantageous embodiment, the temperature sensor is completely enclosed by the sensor housing.

In accordance with an embodiment of the disclosure, the stationary sensor is designed as a Hall sensor, and a control device is also provided, which is integrated in particular in the Hall sensor, for example the said sensor housing, wherein the control device compensates, as a function of a temperature value detected by the temperature sensor, for a temperature dependence of an output value generated by the Hall sensor, in particular in the form of the output voltage. The Hall sensor can be designed as an analog Hall sensor in which the electric current flowing through it is regulated in order to compensate for the temperature dependence, or as a digital Hall sensor in which a temperature dependence is compensated for by a digital correction calculation.

In particular, the slide ring is mounted in a housing so as to be movable in the axial direction and is elastically supported against it, wherein the housing encloses the slide ring in the circumferential direction and the stationary sensor is attached to the outside of the housing. For example, the housing has a frontal base and a circumferential edge connected thereto, which encloses the slide ring in the circumferential direction. The circumferential edge may have an inwardly protruding projection, in particular in the form of a beading, which forms an axial stop for the slide ring, wherein a spring element, for example in the form of a compression spring, in particular a corrugated spring, is provided between the base and an end face of the slide ring remote from the axial stop, which elastically applies pressure to the slide ring in the direction of the stop. The stop then prevents the slide ring from moving out of the housing.

The slide ring can be sealed against the housing by means of a sealing element, for example an O-ring, especially in the radial direction.

The housing can be made of steel or sheet steel, for example.

In particular, the position sensor is designed in such a way that it not only detects the end positions of a slide ring that is not yet worn off and a slide ring that is completely worn off, but also intermediate positions between these end positions. In particular, a continuous movement of the seal face in the axial direction is detected in each position.

In accordance with a particularly advantageous embodiment, the slide ring is designed as a hollow-cylindrical carbon ring or comprises such a hollow-cylindrical carbon ring, wherein the carbon ring has an end face forming the seal face. The end face may project in the axial direction relative to a stop face of the slide ring, which, in the event of maximum axial displacement of the seal face in the housing, abuts against the said housing projection.

According to one embodiment of the disclosure, the at least one magnet is connected to the slide ring via an intermediate component, for example a carriage which is also supported on the stop surface, in such a way that it moves in the axial direction together with the slide ring. For example, the component or carriage is pressed elastically against the stop face.

According to one embodiment of the disclosure, the slide ring is stationary and the counter ring rotates relative to the slide ring, i.e. rotates around the axis of rotation.

According to the method according to the disclosure, the position sensor is used to detect the position of the seal face in the axial direction, and the temperature sensor is used to detect a temperature, namely on the leakage side of the seal face facing away from the fluid-conducting channel or space. The temperature depends on the size of a leakage flow passing over the seal face from the channel or space. Depending on the detection of the temperature and depending on the detection of the position of the mechanical slide ring in the axial direction, a wear condition of the mechanical seal is determined.

Although in the above and following embodiment examples of the disclosure the ring moving in the axial direction to compensate for its wear was called a slide ring and the comparatively harder ring, which in particular does not wear or wears less, was called a counter ring, the present disclosure also comprises embodiments in which the ring moving in the axial direction does not wear off or not only wears off at the end face, but also such embodiments in which a ring which is stationary in the axial direction is designed to be equally soft or softer than the ring movable in the axial direction and thus wears out on its end face in addition to the ring movable in the axial direction or instead of the ring moving in the axial direction.

The solution according to the disclosure makes it possible to better detect the wear of a mechanical seal, namely also states of damage or wear that exceed the usual abrasion. At the same time, the disclosure enables improved detection without the need for significant additional installation space, especially if the temperature sensor is provided in the sensor housing or on the sensor housing. The use of the temperature sensor for different tasks—temperature compensation and detection of an undesired leakage flow—allows an improvement without a significant increase in hardware costs.

If, for example, a comparatively warm fluid is passed through the channel or space, in particular a channel of a rotary passage, the detected temperature value can be compared with a specified limit value and, if the limit value is reached or exceeded by the detected temperature value, an inadmissibly increased leakage flow can be concluded. Alternatively, the rate of rise of a detected temperature curve can be compared with a predetermined heating curve and, if the predetermined heating curve is reached or exceeded by the detected temperature value, an impermissibly increased leakage flow can be concluded. If the fluid passing through the at least one channel or room has a lower temperature than the environment in which the temperature sensor is positioned, the evaluation can be carried out analogously if the temperature falls below a predetermined limit value or a predetermined cooling curve.

BRIEF DESCRIPTION OF THE DRAWINGS

The disclosure shall be described in the following by means of an embodiment example and the figures by way of example, wherein:

FIG. 3 shows an enlargement of the area with the position sensor;

FIG. 4 shows a representation similar to FIG. 3 but with magnets mounted directly in the seal face.

DETAILED DESCRIPTION

Figure 1:
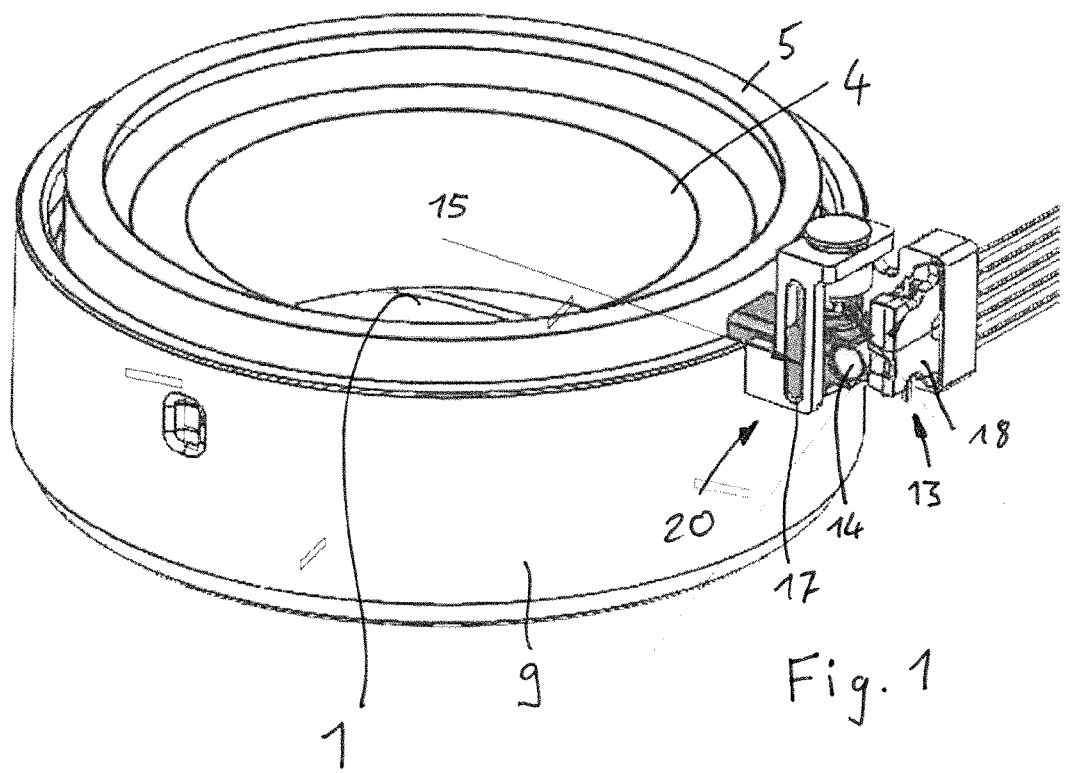
FIG. 1 shows a three-dimensional top view of a mechanical seal designed according to the disclosure.
Figure 2:
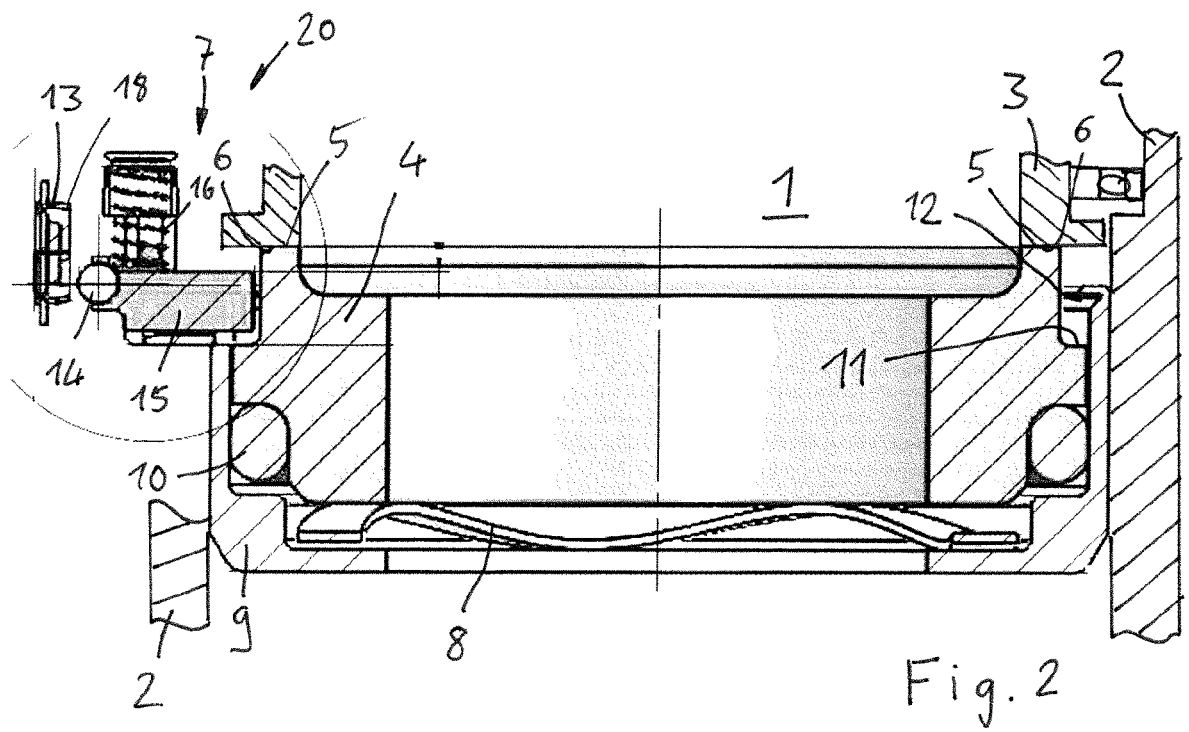
FIG. 2 shows an axial section through the mechanical seal from FIG. 1.

FIG. 1 shows an embodiment example of a mechanical seal according to the disclosure for sealing a rotary passage, having a channel 1 which leads a fluid from a stationary component into a rotating component. The stationary component is schematically indicated in FIG. 2 and numbered with reference numeral 2 and the rotating component is also schematically indicated in FIG. 2 and numbered with reference numeral 3.

As can be seen in FIGS. 1 to 4, the mechanical seal has a slide ring 4, which has a seal face 5 on one axial end face, wherein the seal face 5 is supported on a counter face 6 of the rotating component 3 in order to seal the channel 1 against the environment or a leakage side 7.

The slide ring 4 is made of a wear-resistant material in the area of the seal face 5 and/or the rotating component 3 is made of a wear-resistant material in the area of the counter face 6, wherein the wear is caused by abrasion of the material during the relative rotation between the slide ring 4 or the seal face 5 and the counter face 6. In order to nevertheless achieve the desired sealing in the area of the seal face 5 or counter face 6, the slide ring 4 is supported elastically in a housing 9 at its axial end remote from the seal face 5 by means of a spring element, in this case a compression spring or corrugated spring 8.

The channel 1 extends in axial direction through the housing 9 and the mechanical seal 4 and preferably also through the corrugated spring 8. For sealing an O-ring 10 is provided between the mechanical seal 4 and the housing 9.

Slide ring 4 has a shoulder or stop face 11 which, when slide ring 4 extends in the axial direction out of housing 9, strikes a radially inwardly facing projection 12 of housing 9 to prevent further extension of slide ring 4 out of housing 9.

A stationary sensor 13 is connected to the housing 9, which is positioned radially outside relative to a magnet 14 and is designed as a Hall sensor that detects an axial position of the magnet 14 and thus of the slide ring 4. The magnet 14 is in particular connected directly to slide ring 4 (see FIG. 4) or via an intermediate component 15 which moves in the axial direction together with slide ring 4 and carries the magnet 14 (see FIGS. 1 to 3).

Preferably, the magnet 14 or the intermediate component 15 is supported in axial direction on the stop face 11.

In the embodiment example shown in FIGS. 1 to 3, the intermediate component 15 is elastically supported against the stop face 11 by means of a spring element 16. Alternatively, a rigid connection of the intermediate component 15 to the slide ring 4 could be considered.

In the embodiment example shown in FIG. 4, a magnet 14 is provided which extends in the circumferential direction over the entire circumference of the slide ring 4, or several magnets 14 are distributed over the circumference of the slide ring 4 to allow rotation of the slide ring 4 relative to the stationary sensor 13 without impairing the function of the position detection. However, this is not mandatory.

In order to be able to machine the seal face 5 as flat as possible, the stationary sensor 13 is preferably connected to the housing 9 in a detachable manner, for example by means of a latching connection. This makes it possible, for example, to remove the stationary sensor 13 from the housing 9, especially together with the intermediate component 15 and the sliding rail 17 that holds the intermediate component 15 in a displaceable manner. Subsequently, the seal face 5 can be lapped, for example.

In the case of an embodiment with intermediate component 15, the housing 9 has a notch through which the intermediate component 15 engages radially from the outside in order to support itself on the stop face 11 or to facilitate rigid attachment of the intermediate component 15 to the slide ring 4 in particular.

The stationary sensor 13 has a sensor housing 18 in which a temperature sensor 19 is integrated. The temperature sensor 19 detects the temperature of a leakage flow of the fluid carried in channel 1 which passes from channel 1 via seal face 5, wherein the detected temperature is dependent on the size of the leakage flow, because the arrangement of the temperature sensor 19 or the stationary sensor 13 in the leakage flow increases the heat transfer between the leakage flow and the stationary sensor 13 or temperature sensor 19 as the leakage flow increases.

The stationary sensor 19 also forms a position sensor 20 together with the magnet 14 to detect the position of the slide ring 4 in the axial direction.

The position sensor 20 is designed as a Hall sensor and the temperature sensor 19 is also used to compensate for the temperature dependence of the measured variable detected by the Hall sensor. For this purpose, a control device 21 may be provided in the sensor housing 18 or outside it, which controls the position detection and in particular the leakage flow detection.

LIST OF REFERENCE NUMERALS

1 Channel
2 Stationary component
3 Rotating component
4 Slide ring
5 Seal face
6 Counter face
7 Leakage side
8 Corrugated spring
9 Housing
10 O-ring
11 Stop face
12 Projection
13 Stationary sensor
14 Magnet
15 Intermediate component
16 Spring element
17 Sliding rail
18 Sensor housing
19 Temperature sensor
20 Position sensor
21 Control device

The invention claimed is:

1. Mechanical seal for sealing at least one fluid-conducting channel extending in at least one of a stationary component and a rotating component from the environment,
the mechanical seal having a slide ring which is supported in a sealing manner in an axial direction against a counter ring and, to compensate for wear on at least one of a front-end seal face of the slide ring and on a counter face of the counter ring against which the slide ring is biased, the slide ring is supported against the counter ring elastically and movably in the axial direction with;
the mechanical seal having a position sensor for detecting the position of the slide ring in the axial direction;
wherein, a temperature sensor is provided on a leakage side of the seal face facing away from the channel, the temperature sensor at least indirectly detects a temperature which is dependent on the magnitude of a leakage flow passing from the channel via the seal face.

2. Mechanical seal according to claim 1, wherein the position sensor comprises at least one magnet fixed to the slide ring or supported in the axial direction against the slide ring and moving with the slide ring in the axial direction, and a stationary sensor, positioned radially outside the slide ring and detecting the position of the magnet in the axial direction.

3. Mechanical seal according to claim 2, wherein the temperature sensor is integrated in the stationary sensor.

4. Mechanical seal according to claim 3, wherein the stationary sensor comprises a sensor housing positioned in the leakage flow, within which or on which the temperature sensor is positioned, wherein the temperature sensor is in particular completely enclosed in the sensor housing.

5. Mechanical seal according to claim 4, wherein the stationary sensor comprises a Hall sensor and the mechanical seal further comprises a control device integrated in the Hall sensor, the control device compensates for a temperature dependence of an output value generated by the Hall sensor, in the form of an output voltage, as a function of a temperature value detected by the temperature sensor.

6. Mechanical seal according to claim 4, wherein the slide ring is mounted in a housing so as to be movable in the axial direction and is elastically supported against said housing, wherein the housing encloses the slide ring in the circumferential direction, and the stationary sensor is attached to the outside of the housing.

7. Mechanical seal according to claim 4, wherein the slide ring comprises a hollow cylindrical carbon ring having an end face forming the seal face.

8. Mechanical seal according to claim 3, wherein the stationary sensor comprises a Hall sensor and the mechanical seal further comprises a control device integrated in the Hall sensor, the control device compensates for a temperature dependence of an output value generated by the Hall sensor, in the form of an output voltage, as a function of a temperature value detected by the temperature sensor.

9. Mechanical seal according to claim 8, wherein the slide ring is mounted in a housing so as to be movable in the axial direction and is elastically supported against said housing, wherein the housing encloses the slide ring in the circumferential direction, and the stationary sensor is attached to the outside of the housing.

10. Mechanical seal according to claim 8, wherein the slide ring comprises a hollow cylindrical carbon ring having an end face forming the seal face.

11. Mechanical seal according to claim 3, wherein the slide ring is mounted in a housing so as to be movable in the axial direction and is elastically supported against said housing, wherein the housing encloses the slide ring in the circumferential direction, and the stationary sensor is attached to the outside of the housing.

12. Mechanical seal according to claim 3, wherein the slide ring comprises or is formed from a hollow cylindrical carbon ring having an end face forming the seal face.

13. Mechanical seal according to claim 2, wherein the slide ring is mounted in a housing so as to be movable in the axial direction and is elastically supported against said housing, wherein the housing encloses the slide ring in the circumferential direction, and the stationary sensor is attached to the outside of the housing.

14. Mechanical seal according to claim 2, wherein the slide ring comprises or formed from a hollow cylindrical carbon ring having an end face forming the seal face.

15. Mechanical seal according to claim 1, wherein the slide ring comprises hollow cylindrical carbon ring having an end face forming the seal face.

16. Mechanical seal according to claim 1, wherein the slide ring is stationary and the counter ring rotates relative to the slide ring.

17. Method for monitoring the wear of a mechanical seal according to claim 1, comprising the steps of detecting the position of the slide ring in the axial direction is detected with the position sensor and detecting a temperature with the temperature sensor, which temperature is dependent on the size of a leakage flow passing from the channel via the seal face, and determining a state of wear of the mechanical seal as a function of the detection of the position and the temperature.

18. Method according to claim 17 for monitoring the wear of a mechanical seal further comprising the step of compensating for a temperature dependence of an output value generated by the position sensor in the form of an output voltage with a temperature value detected with the temperature sensor.

19. Method according to claim 17, in the form of an output voltage the leakage flow is formed exclusively by a part of the fluid passed through the channel in the form of an output voltage in a regular operation.

20. Method according to claim 17, wherein the detecting step is performed continuously during regular operation of the mechanical seal.

* * * * *